(12) United States Patent
McGoveran

(10) Patent No.: US 7,620,664 B2
(45) Date of Patent: Nov. 17, 2009

(54) COMPUTER-IMPLEMENTED METHOD FOR TRANSLATING AMONG MULTIPLE REPRESENTATIONS AND STORAGE STRUCTURES

(76) Inventor: David O. McGoveran, 15905 Bear Creek Rd., Boulder Creek, CA (US) 95006

( * ) Notice: Subject to any disclaimer, the term of this patent is extended or adjusted under 35 U.S.C. 154(b) by 382 days.

(21) Appl. No.: 11/649,089

(22) Filed: Dec. 31, 2006

(65) Prior Publication Data

US 2008/0010235 A1 Jan. 10, 2008

Related U.S. Application Data

(63) Continuation-in-part of application No. 10/114,609, filed on Apr. 2, 2002, now Pat. No. 7,263,512.

(51) Int. Cl.
*G06F 17/00* (2006.01)
(52) U.S. Cl. .......................... 707/203; 707/1; 707/100; 707/101; 707/102; 707/103 R; 715/229
(58) Field of Classification Search ........................ None
See application file for complete search history.

(56) References Cited

U.S. PATENT DOCUMENTS

| 4,514,826 | A | * | 4/1985 | Iwata et al. ..................... 707/7 |
| 4,769,772 | A | * | 9/1988 | Dwyer .......................... 707/2 |
| 4,918,593 | A | * | 4/1990 | Huber .......................... 707/200 |
| 5,226,158 | A | * | 7/1993 | Horn et al. ................... 707/201 |
| 5,247,665 | A | * | 9/1993 | Matsuda et al. ............. 707/101 |
| 5,455,945 | A | * | 10/1995 | VanderDrift .................... 707/2 |
| 5,493,671 | A | * | 2/1996 | Pitt et al. ..................... 707/203 |
| 5,551,027 | A | * | 8/1996 | Choy et al. .................. 707/201 |
| 5,566,333 | A | * | 10/1996 | Olson et al. .................. 707/102 |
| 5,590,324 | A | * | 12/1996 | Leung et al. .................... 707/5 |
| 5,594,837 | A | * | 1/1997 | Noyes .......................... 706/55 |
| 5,615,361 | A | * | 3/1997 | Leung et al. .................... 707/3 |
| 5,701,453 | A | * | 12/1997 | Maloney et al. ................ 707/2 |
| 5,701,466 | A | * | 12/1997 | Yong et al. ................... 707/100 |
| 5,717,924 | A | * | 2/1998 | Kawai .......................... 707/102 |
| 5,734,887 | A | * | 3/1998 | Kingberg et al. ............... 707/4 |
| 5,870,739 | A | * | 2/1999 | Davis et al. .................... 707/4 |
| 6,088,524 | A | * | 7/2000 | Levy et al. ...................... 707/3 |
| 6,578,028 | B2 | * | 6/2003 | Egilsson et al. ................ 707/2 |
| 6,591,272 | B1 | * | 7/2003 | Williams ..................... 707/102 |
| 2003/0028511 | A1 | * | 2/2003 | Sluiman ........................ 707/1 |

* cited by examiner

*Primary Examiner*—Yicun Wu
*Assistant Examiner*—Yu Zhao

(57) ABSTRACT

This is a computer-implemented method for managing translating among, and understanding multiple representations and storage structures of data by accessing and updating physical storage through a relational representation. The present invention supports both data independence and automatic derivation of descriptions of data representations by manipulating membership abstractions in the logical representation, while the prior art is restricted to user-supplied denotations and catalog entries.

15 Claims, 6 Drawing Sheets

'EMPLOYEE' RELATION

| ENUM | ENAME | ETITLE | EDEPT | EDEPTNAME |
|---|---|---|---|---|
| 3 | Bob Findlay | COO | 1 | Corp. HQ |
| 19 | Rowena Hatchett | Chief Counsel | 13 | Legal |
| 567 | Saul Gelt | Admin. Ass't II | 35 | Shipping, Colorado |
| 1,424 | Tee Yang | Janitor I | 256 | Atlanta Field Office |

FIGURE 4

UPDATING A PROJECT JOIN
(ILLUSTRATION OF DELETE AND INSERT PHASES)

PROBLEM:

CREATE VIEW JOIN_EM (ENUM, EDEPT, MDEPT, MNUM) AS
SELECT E.ENUM, E.DEPT, M.DEPT, M.MNUM
    FROM EMP E, MGR M
    WHERE E.DEPT = M.DEPT

UPDATE JOIN_EM SET MNUM = 1, MDEPT = 2
    WHERE ENUM = 5 AND EDEPT = 1 AND MNUM = 2

---

RESOLUTION IN PSEUDO-SQL*

*Apply Delete Phase to MGR:*
DELETE MGR
    WHERE MNUM = 2 AND DEPT = 1 AND
    EXISTS ( SELECT ENUM FROM EMP WHERE ENUM = 5 AND DEPT = 1)

*Apply Insert Phase to MGR:*
INSERT INTO MGR (MNUM = 1, DEPT = 2)
    WHERE
  EXISTS ( SELECT MNUM FROM MGR WHERE MNUM = 2 AND DEPT = 1)

*Apply Delete Phase to EMP:*
DELETE EMP
    WHERE ENUM = 5 AND DEPT = 1 AND
    EXISTS ( SELECT MNUM FROM MGR WHERE MNUM = 2 AND DEPT = 1)

*Insert Phase Applied to EMP:*
INSERT INTO EMP
    ( DEPT = 2
     ENUM = 5,
     ESAL = (SELECT ESAL FROM EMP WHERE ENUM = 5) ) AND
    EXISTS ( SELECT MNUM FROM MGR WHERE MNUM = 2 AND DEPT = 1)

---

*Notes:
1. All read operations read values from the before image.
2. DELETE is applied before INSERT to any given relation, but all such ordered pairs of base relation modifications proceed concurrently or in a manner that produces an equivalent effect to concurrent operation.
3. "DELETE" and "INSERT" here are not identical to the SQL operations of those names
    (see description of algorithm).

FIGURE 6

COMPUTER-IMPLEMENTED METHOD FOR TRANSLATING AMONG MULTIPLE REPRESENTATIONS AND STORAGE STRUCTURES

CROSS REFERENCE TO RELATED APPLICATIONS

This is a continuation-in-part of Ser. No. 10/114,609, filed on Apr. 2, 2002 now U.S. Pat. No. 7,263,512. This application is filed to continue the prosecution, separately, of the invention described in the claims 1-8 below, and expressly incorporates both below and by reference all of the original application's specification and drawings.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

1. Field of the Invention

Database accessing that supports identifying relations amongst individual data elements (as distinct from the efficient accessing of discrete, individual data elements) has grown in power and utility. Businesses are able to obtain valuable new business insights by using methods for accessing and viewing data that support combinations, re-combinations, or analyses of both existing data elements and structures, combinations, or relations of said data elements. Several major corporations (e.g. Oracle Corporation) have shown that a relational database ("RDB") and a relational database management system ("RDBMS") that enable more flexible database accessing are valuable.

This invention primarily implements a methodology for uniform handling of data elements, structures, and relations denoted in and forming a relational database by the relational database management system or by users thereof without requiring explicit and hardware-dependent memory management, though it also handles the relations manipulated by and in a relational database or by users thereof so as to optimize query processing, table management, transaction handling, and distributed or remote database maintenance.

2. Description of the Related Art

A Relational Database Management System ('RDBMS') is a software system for creating, maintaining, and using a Relational Database ('RDB'). An RDB is a means for representing data elements and operations on said data elements via the relational model (or some variant on the relational model such as the commonly available SQL packages), where the RDB as a whole serves as a logical model for the sub-portion of the real world instantiated in the RDB. The RDBMS includes, among other elements, both a System Catalog that contains the definitions of the logical model as represented in the physical memory, and the respective denotations thereof which serve as symbolic abstractions for the relations and constraints comprising the RDB; and a Query Language Processing Engine for executing relational request(s) wherein said requests contain certain allowed processor operations. The allowed processor operations include logical operations (e.g. 'AND', 'OR', 'NOT') and relational operations (e.g., join, product, difference, divide, intersection, restriction, projection, aggregation, union, grouping, and partitioning); they may also include mathematical operations, including both direct processor function calls and mathematical algorithms (e.g. 'PLUS', 'SUM', 'AVERAGE'); and allowed character, text, and graphical operations (e.g. 'NAME', 'CHART') provided for within the RDBMS for data input, manipulation, and output. The System Catalog and its contents are accessible to, and are often modifiable by, the Query Language Processing Engine. System Catalogs are implemented in various forms, as is well known to those familiar with the art. For example, the System Catalog may be human-readable, compiled or otherwise embedded in programmatic code, encrypted, stored as relations, may be static or active, and so on. Either or both of the System Catalog and the Query Language Processing Engine may be implemented internal to the RDB, external to the RDB, or in some combination of internal and external implementation.

There are numerous functionally equivalent symbolic abstractions, well known to those familiar with the art, that can be used for expressing and manipulating the semantics of sets including, for example, those for set theory, predicate logic, relational algebra, and relational calculus. A Set is a collection of data elements, representable by and satisfying a logical predicate (often referred to as a 'membership function' or 'membership criteria'), wherein each data element belonging to a set shares at least one property that is common to its set's members, yet uniquely distinguishes them from any other data element not belonging to that set; and the logical predicate satisfied by each member describes the necessary and sufficient properties for belonging to that set. An abstract symbolic expression such as a logical predicate which either fully or partially defines a set's members is referred to here as a Membership Abstraction. The logical predicate contains one or more variable terms ('predicate variables'), each of which may take values pertaining a property of the set; and may contain one or more constant terms as well. Every element of a set is distinguished by some property so that a particular element occurs at most once in any particular set; every element is unique. The Relational Database ('RDB') is a database wherein the data is organized into rows (known formally as 'tuples') which are further grouped into Sets known as Relations, each said Relation having (either implicitly or explicitly) a distinguishing property or properties grouping a Set's elements together and distinguishing them from non-members; and the elements of the Set being the rows of the Relation. The standard instantiation of a Relation is a table. The single-variable terms of the logical predicate pertaining to the Set and which the Relation represents each refer to a shared property of the Set and are represented by a column (also known as an attribute) of the Relation; the number of predicate variables in the logical predicate is the number of columns in the Relation which represents the Set. The values which a particular predicate variable may take within a variable term of the logical predicate are the permissible values of the Relation's column; that is, each column is defined as taking the values of a particular 'domain' (a set of values), and the value of a particular column in a particular row being exactly one such value. Multi-variable terms in the logical predicate contain only variables that are each individually represented by some column of the Relation. The logical predicate must evaluate to 'True' on substitution of each predicate variable therein with the corresponding values in the columns of any particular row of a Relation. Relations typically have a time-varying membership; at any given time only some subset of rows belong to the corresponding Set of all those that might permissibly belong given solely the terms of the logical predicate whose Truth or Falsity depend only on recorded values of data elements. In order to capture the time-varying aspect of Set membership, the logical predicate may be considered as being augmented with a special constant term called an 'assertion predicate' by which a suitably authorized user may assert that a particular permissible member either does or does not belong to the Set. A relational insertion operation thus corresponds to identifying the set of zero or more potential member rows that satisfy some logical condition or conditions and setting the value of the assertion predicate to 'True' for these rows; a relational deletion operation corresponds to identifying the set of zero or more member rows that satisfy some logical condition or conditions and setting the value of the assertion predicate to 'False' for these rows. In practice, no RDBMS implementation of insertion and deletion operations have been manifestations of relational insertion or relational deletion as defined above; often the RDBMS implements row by row modifications (including deletion, insertion, or update) of the Relation; and the RDBMS offers no explicit support for the assertion predicate.

The uniqueness of the rows in the Set pertaining to the Relation is determined entirely by the values in those rows; two rows in a particular relation are not unique if the values of corresponding columns are identical for every column value. Each Relation is denoted by the RDBMS in a form that serves as a symbolic abstraction that can be manipulated via relational logic. In practice, most current RDBMS implementations permit access and manipulation of 'tables' (the standard instantiation of relations). Some tables are not strictly Relations inasmuch as they permit duplicate rows, rows that contain undefined property values (often designated with special markers called 'nulls'), rows with dissimilar semantics, default values, and so on. The processing of requests involving such tables is (1) less uniform than that for Relations, (2) not prescribed by the relational model, (3) may result in anomalous results not explicitly predicted by the relational model, and (4) unique to the particular RDBMS implementation.

A Relation is commonly known to and represented within an RDB as a table having rows and columns, and is a particular type of Set whose members are both rows and satisfy both (1) the logical predicate defining potential membership in the Set and referencing no other sets, and (2) the assertion predicate, a predicate asserting that those members belong to said Relation (i.e., are actual, rather than just potential, members of the Set). A Relation Predicate is the logical predicate corresponding to a Relation and describes the necessary properties for a row to belong to the Relation. All rows having said necessary properties could, but need not be, members of the Relation; while rows with the necessary properties are potential members of the Relation, if and only if these potential members have also been asserted to be members of the Relation by some suitably authorized user of the RDBMS.

For example, an 'Employees' Relation might have columns for Employee Number (ENUM), Employee Name (ENAME), Employee Salary (ESAL), and Employee Department Number (EDEPT). The 'Employees' relation will have a Relation Predicate Emp(x) that stands for the logical definition of the Relation; e.g. 'Emp(x)' means that: 'x is an Employee AND x has been assigned Employee Number ENUM AND x has Employee Name ENAME and x earns Employee Salary ESAL and x works in Department Number EDEPT'. The actual members of the 'Employees' Relation are those rows that have been entered into the RDB, and therefore both have the properties specified by Emp(x) and have been asserted to belong to the Relation 'Employees'. (Note that x is a symbol representing an arbitrary entity commonly referred to as an 'employee.')

In practice, the Relations in an RDB are most often defined implicitly, with row membership in a Relation being specified on a combination of user assertion and satisfaction of Constraints. Most RDBMS's use Constraints to manage their data. (Date & McGoveran, "How to Avoid Database Redundancy", *Database Programming & Design*, Vol. 7 No. 7, July 1994, p. 46, 48.) A Constraint is a condition that the RDBMS tests against for a truth value; it is also a means for ensuring the RDB's integrity, as a Constraint is used to 'constrain' the RDB's data and Relations to those permissible (according to the designers and builders) and according the proper interpretation of the RDB's meaning. Constraints are defined, classified (e.g., domain, column, row, relation, or multi-relation), enforced, maintained, and accessible to the RDBMS. Each Constraint may be expressed as a logical predicate or its equivalent, and so denoted within the System Catalog as a symbolic abstraction. Domain constraints are used to determine whether a data element belongs to a given domain. (E.g. is the value represented a character? a number? A computer distinguishes between the numeral '1' and the number '1', between the letter 'x', a potential but undetermined set member 'x', and a variable 'x'.) A column constraint (also known as an attribute constraint) requires data elements within a particular column to belong to a specified domain (i.e. valid entries are those possessing a specific attribute; e.g. American salary values are in 'dollars'). A particular relation constraint limits membership in a particular Relation (all members of this Relation satisfy the conditions of the constraint). And multi-relation constraints, also referred to sometimes as 'database' constraints, are conditions which must be satisfied by multiple relations. A referential integrity constraint is a particular type of database constraint. Within a transaction, RDBMS programs may check to see whether domain, column, and relation constraints are satisfied after each individual, subordinate operation, but must check multi-relation constraints after all operations on the referenced tables are completed (since a failure after an intermediate operation might be corrected by a subsequent operation on one of the referenced relations). In practice, the combination of explicitly defined constraints known to and enforceable by the RDBMS is incomplete in that it does not completely define the membership of the Relation, requiring a combination of extreme care on the part of the user and external filtering of attempted updates using, for example, application programs. In practice, errors due to incomplete or inaccurate implementation of constraints are common.

RDB designers and users could refer to the logical description of a Relation within the RDB by using a Relation Predicate. (Date & McGoveran, "Updating Joins and Other Views", *Relational Database Writings* 1991-1994, Part II, Chapter 6, pp. 267-284.) A Relation Predicate is a portion of the logical predicate for the Set which the Relation represents, including all terms of that logical predicate excepting the assertion predicate. A Relation Predicate properly expresses the correct (as asserted by the RDBMS's user) interpretation of a relation; i.e. it is the expression of the 'meaning' of the Relation. By extension, it is the expression of the 'meaning' of a table in that RDB insofar as the meaning of that table may be made unambiguous. The Relation Predicate will join together the logical and relational predicates that constrain the relation's data, and allow the user to understand them. For example, a one-row, three column Table 'Date', with values '01', '01' and '02' uses three domain constraints (numeral, numeral, numeral), three column constraints (month, day, year), and one relation constraint (dates in the current century), to enable a proper interpretation of these values as "Jan. 1, 2002". At least that would be the interpretation until the year 2100, when the default meaning could reasonably become "Jan. 1, 2102", The Relation Predicate for 'Date' can be expressed as 'E(x, y, z), x is a member of Months, y is a member of Days, z is a member of Years'. 'Months' and 'Days' and 'Years' are domains having logical predicates that are further defined, e.g., x is a member of domain Numerals & '1<=x<=12'; y is a member of domain Numerals & '1<=y<=31'; z is a member of domain Numerals & '1999<z<2100'. The Relation Predicate for 'Date' might also include a set of conjuncts properly constraining the value of 'Days' according to the value of 'Months', e.g. 'if x=1 then y<=31 ' & 'if x=2 then y<=29', and so on. Furthermore, the Relation Predicate for 'Date' might constrain the value of 'Days' according to the values of 'Years' and 'Months' so as to account for leap years, e.g. 'if x=2 & z modulo 4=0 then y<=28'. The logical conjunction of these constraints define the Relation 'Dates' and any data contained therein. In practice, no RDBMS implements an algorithm for creating or capturing Relation Predicates, extensions to the System Catalog to store Relations Predicates, or means to use Relation Predicates for any purpose.

In broad terms, an RDB is a logic-based model of truths asserted about the real world, and the RDBMS is the means whereby that model, and its logic, is manipulated and maintained within the computer's physical reality (and limitations). These truths include discrete, atomic, data elements and combinations established by the RDBMS's designers, builders, and even users. The value of an RDB derives from its capabilities for logic-based recombination and manipulation using the 'relational model' and working with and through Relations; that value is significantly and negatively affected by anomalous or non-uniform or unpredictable behavior, and especially as regards updates or other operations on relations.

Current RDB's distinguish between Base Relations and Derived Relations. A Base Relation is one where the RDBMS maintains a direct corollary between the physical organization of the computer's memory and the logical organization of a Set's elements. A Derived Relation is a representation of a Set whose members are logically derived from, and represent a combination from, those members of other Sets that further satisfy the logical predicate that both details the necessary and minimal properties of the derived Set; it will also have (either implicitly or explicitly) both a logical and relation predicate that distinguishes those elements from others which lack those necessary and minimal properties, assertion of belonging to the Derived Set, or both. In practice, a Derived Relation is defined by relational and logical operations on other Relations, any of which may themselves be Derived Relations. A Derived Relation may also consist of data elements who are stored in physically-separated portions of the computer's memory. Derived Relations may be any of several types, e.g., Views (defined below), materialized views, 'snapshots', replicas, and query results. Derived Relations are particularly valuable because the assertion of belonging can arise implicitly though the computer's logical recombination and analysis of Base Relations, rather than depending entirely on human input.

There are many ways to combine the rows and columns of Base Relations. Also, a Derived Relation may be defined or created via a relational expression that references any combination of Base Relations, other Derived Relations, or both Base and Derived Relations. In such combinations, each of the referenced relations in the combined relational expression is known as a Source Relation for the combination Derived Relation; the Derived Relation is sometimes referred to as the Target Relation; and the Derived Relation is Dependent upon its Source Relations. Most users, however, deal not with the Base Relations as such, but work from and with their limited, often query-driven, report-driven, or software application-driven view into a RDB.

A View is an named relational and logical expression representing data that is made visible to the user in a form that is usually different from the form of the Source Relations and convenient to a particular use or uses, i.e. it is the user's 'view into the relational database's contents'. A View has a Relational Predicate (and thereby expression in the relational calculus, relational algebra, and predicate calculus). A View can be understood as a 'virtual relation', because the data belonging to a View need not be explicitly stored in the RDB as a distinct table; in fact, a View may represent one or more relational operations on a single relation or on a plurality of relations. The data belonging to a View is derived from data belonging to one or more other relations when the View is manipulated by name in relational expressions, and is transient in the sense that it does not exist if the data belonging to those other relations does not exist.

Views are one expression of a Derived Relation, as stated above. Views differ from other types of Derived Relations in that Views are named virtual relations with a storage-persistent definition (at least until the View is explicitly destroyed or 'dropped') and so may be manipulated by authorized users (other than the creator of the View) through reference to that name in relational expressions and at arbitrary times. A Materialized View is a type of View; the data as seen through the View is made storage-persistent and modified only when the Source Relations are modified.

Most RDBMS implementations explicitly maintain and track Dependencies (whether (1) between relations or (2) between groups of columns of a relation), with these Dependencies defined, denoted as symbolic abstractions, and accessible to the RDBMS. In practice, this is usually done for relations as referential integrity Constraints, or View Dependencies, but not between non-view derived relations and their source relations.

For example, the 'Employees' Relation (as defined above) and a 'Departments' Relation (consisting of Department Number DNUM, Department Name DNAME, and Department Manager's Employee Number MNUM) might be Base Relations. These two relations may be considered to be a Base Set. From the Base Set individual relations can be combined via relational operations to form one or several Derived Relations. A Derived Relation called 'Managers' might be defined as consisting of columns Department Manager's Employee Number MNUM, Department Manager's Name ENAME, and the Department Name DNAME of the department managed by the manager. 'Managers' is the result of performing a relational join of the 'Employees' and 'Departments' Base Relations, with the additional Constraint that 'MNUM=ENUM'. 'Managers' is said to have a 'dependency' on both 'Employees' and 'Departments'.

'Managers' might, for example, be a View. As a named expression, its definition can be stored in memory and can be reused by referencing 'Managers' even though the actual rows of 'Managers' are created only at execution time, and are based on the then-current rows in the Base Relations ('Employees' and 'Departments'). Alternatively, the definition of 'Managers' might be an internal Derived Relation representing a sub-step to a query asking to see all 'VicePresidents' wherein the latter are defined as those whose employees are themselves all 'Managers'; while 'VicePresidents' is displayed to the user, the interim Derived Relation of 'Managers' may well not be. (Currently, most RDBMS programs do not provide a way to name the Derived Relations that result from runtime query execution).

If the only relations which users of a RDBMS (or computer programs) can access are Derived Relations, then these Derived Relations, either directly or indirectly, form the linkage between the physical location and structure in the computer memory and the descriptive (as expressed, for example, by the conceptual or logical schemas) location and structure in the RDB, handled by the RDBMS. In practice, an RDBMS most often predetermines a significant portion of physical location and structure in the computer memory of Base Relations. If all operations (including access and update) that are valid for Base Relations are likewise valid for Derived Relations, the linkage attains maximum flexibility; it then permits modification of the set of relational expressions which define the set of Derived Relations in such a way as to leave the rows and columns of each of those Derived Relations unchanged, despite structural reorganization of the set of Source Relations (even when those Source Relations happen to be Base Relations) so long as the information necessary to the creation of those Derived Relations is preserved. This property is known as Data Independence and it is intended to be a key value to relational (as opposed to other) databases. It is also, however, badly limited when Base and Derived Relations are not handled in a uniform manner as, for example, when some Derived Relations cannot be updated in the same manner as Base Relations.

RDBMS programs have four fundamental functions that are used to manage all data modification operations on relations; these are respectively Insert, Delete, Update, and Retrieval. The first three of these are used independently. The Insert operation allows new data to be entered into a particular relation. The Delete operation allows existing data to be removed from a particular relation. And the Update operation changes one or more data elements within a particular relation. The fourth function, Retrieval, is used to locate, manipulate, and produce the data in the RDB and may be used either independently or in combination with one of the other three. Other processing (logical, relational, arithmetic, or transformational) may be used to further facilitate changing data, its presentation to the user, or the nature of the RDB. An RDBMS which has Data Independence will allow any of these four functions to take place without the user having to be concerned with the physical storage of the data or with the structure of the RDB. A recognized major goal for all RDBMS designers, users, and creators is increasing Data Independence.

Existing RDBMS programs allow accessing some combinations of derived data in static, report-only views, and allow updating particular combinations of physically stored data; but the current state of the art differentiates between base and derived relations, asserting, believing, or holding that the latter are inherently not updateable. Also, existing RDBMS programs are plagued by unpredictable and non-intuitive failures in updating derived data; these failures can require a 'rollback' which, if not performed correctly, can leave the database in an inconsistent state. In practice, the updating of derived data is generally avoided. Additionally, because of this differentiation between base and derived relations, the creation, maintenance, and merging of multiple physical databases, even when logically feasible, is often pragmatically difficult, costly, effortful, infeasible, or just deemed impossible.

Relational databases use data elements and the relationships between them to model a portion of the world. In practice, the data elements are organized at the logical level into relations, and are perceived as such by the user. (Date, *An Introduction To Database Systems*, 6*th* Edition, Addison-Wesley, 1995, Ch. 3, p. 52; Addison-Wesley; ISBN0-201-54329-X.) The RDB does not integrate the denotation, expression, and instantiation of a relation such that the model is clearly linked both to the stored tables and the data elements by means accessible to both the user(s) and the RDB or RDBMS. A relation's title (its denotation or referent) is either chosen by the designer or created by the system. Optimally, it should convey some meaning to the user in the manner of a mnemonic. It may have come from an entity-relationship modeling or CASE tool. It may consist of some concatenation of source table titles according to pre-set rules (e.g. the table combining EMPLOYEE and 401K_PLAN_MEMBERS may be titled EMPLOYEE_401K_PLAN_MEMBERS). But the RDB and RDBMS currently do not have a direct tie between the relation, its title or denotation, and the logical model, and the denotation is not separably manipulable according to predicate logic as a symbolic abstraction for the relation itself, or as a symbolic abstraction of the manipulation of the data elements and their combination therein. Moreover, constraints, rather than being treated equally as logical predicates are generally referred to simply as constraints, and they may have been defined as relational expressions; they have usually been separately maintained at the users discretion and as SQL "relational" expressions that are used only to preclude updates rather than enable them.

This distinction and lack of functional relationship between denotation (the title), expression (the title as name), and instantiation (the data elements comprising the stored table), prevents effective symbolic abstraction and requires all logic-based manipulation to manage all of the individual data elements, tying the RDB and RDBMS to the computer's ability to manage its physical memory in which those same data elements happen to be stored and represented.

Furthermore, current relational database management systems distinguish between base and derived relations, and base and derived data; that is, between those relations or data explicitly contained in the physically-demarcated memory groupings denoted as the relational database's 'base tables', from those contained or expressed by temporary (often query-driven) combinations of the base tables. These temporary combinations are known as the relational database's 'derived tables'. (Certain derived tables are also commonly referred to in the literature as 'views'.) This is a self-imposed handicap the field has failed to recognize, due in part to an earlier theoretical error.

This distinction limits an RDBMS's capability to update derived tables (relations or data); limits users' access to derived tables; and can create problems (in the form of difficult, memory- or processor-expensive transactions, or unintended or unpredictable results) for those RDBMS that try to access or update derived tables (some do, some just don't). This distinction also can cause a RDBMS to use extra memory in duplicating base data elements inside multiple tables. Existing methods to manage updates or access to derived tables can create potentially contradictory data sets, creating major problems for the RDBMS and potentially rendering the RDB itself unreliable.

Furthermore, distinguishing between 'base' and 'derived' tables (and therefore base and derived relations) means that no such RDBMS permits full data independence between a data expression and the memory location corresponding to its physical storage, or uses uniform semantics with all operations, including derived as well as base data expressions. An RDBMS possessing full logical data independence is one in which (1) the descriptive representation of the data in the database can be changed to accommodate additional types of data, supporting new programs that will use that data while still maintaining the existing descriptions for previously-existing programs and users; and, (2) multiple descriptive representations can be provided, each specialized for a particular group of users or programs, each without implying any need to alter existing elements of physical storage subject to the constraint that all representation changes are information preserving. The lack of full logical data independence in turn creates problems with merging relational databases, distributing a relational database over multiple locations, and handling multiple versions of a relational database (either over time or locations separated by message time), which means that users often find new versions of a relational database become non-backward-compatible with the pre-existing version, which defeats one of the principal goals of using a relational database. Furthermore, the lack of uniform semantics for both base and derived relations can cause failures to certain updates, creating extra relational database system maintenance and requiring rollback of transactions.

Few existing RDBMSs provide means to update derived relations; those that do, do so only for an arbitrarily restricted few derived relations (Date & McGoveran, "Updating Union, Intersection, and Difference Views", Database Programming & Design, Vol. 7 No. 6, p. 46). These means for updating derived relations are very restrictive, are tied to the physical memory usage of the RDB, are inconsistent with those used for base relations, and their use often results in error messages sent to the user of the RDBMS. Users compensate for these restrictions by avoiding the use of derived relations, developing programs to provide update of specific derived relations, or through manual workarounds. For example, IBM's DB2 and Oracle's Oracle 9i RDBMS products do not permit update of any derived relations (specifically Views) when the update's SQL uses the SQL keywords 'DISTINCT', 'GROUP BY', or 'ORDER BY'. There are many other restrictions on updating views such as those that are derived via relational aggregation and UNION. Only a subset of those views derived via join operations can be updated by Oracle; DB2 does not support join view updates at all.

No RDBMS products support general update of all non-view derived relations, though some provide partial update support of materialized views, snapshots, or replicas. And, for those which provide some support, that support is extremely restrictive. Despite the need, there are no RDBMS products providing a common and intuitive method by which all relations (base and derived) can be updated (Date & McGoveran, "How To Avoid Data Redundancy", Database Programming & Design, Vol. 7 No. 7, p. 46, July, 1994; Date & McGoveran, "Updating Joins and Other Views", Database Programming & Design, Vol. 7 No. 8, p. 43, August 1994). Since all RDBMS implementations distinguish between updating base and derived relations, users must learn the particular behavior of the RDBMS for each type of derived relation, and must be aware of and can easily determine whether or not a particular relation that they wish to update is a base relation or a derived relation; and this restriction further violates logical data independence and forms an impediment to physical data independence.

Additionally, treating base relations as stored tables prevents attaining a major goal of physical data independence, that of separating where and how a table is stored from manipulating the logical representation for the table's instantiation. Symbolic abstraction of the logical representation and user requests into relational predicates allows for rapid logical manipulation to be separated from the mechanics of managing the physical memory, which otherwise limit the speed and power of the RDBMS. Currently, an RDBMS at best clumsily handles its own internal representations, lacking means for symbolic abstraction of the model to which it has been designed and built, and which it uses. The lack of such abstraction being available to the RDBMS increases the RDBMS's difficulty in distinguishing between errors caused by logical inconsistencies, data errors, and memory limitations.

As no RDBMS maintains Relation Predicates for the relations or tables in its system catalog, separating out logical and data processing (e.g. for optimization purposes alone) is difficult. Although almost every RDBMS provides support for using constraints in managing and enforcing the consistency of an RDB, no RDBMS uniformly and consistently maintains constraints in its system catalog as Relation Predicates, and makes them accessible to the RDBMS or readily apparent to users. Users, who would benefit from having a uniform method by which to understand the meaning of a table when a particular constraint is applied to that table, are thus liable to misinterpret the data in a table, to access a table with a different meaning than the one intended, or to use a table in a manner inconsistent with its meaning. Each of these may lead to corruption of data when the RDB is subsequently updated, or may cause the user to make incorrect business decisions.

Although SQL uses expressions involving predicates for access and update of relations, no RDBMS provides a uniform and consistent method of accessing or updating relations, in which the semantics or meaning of that access or update is based on and expressible in relational predicates; these might be referred to respectively as an 'Access Predicate' and an 'Update Predicate'. Use of such an 'Update Predicate' would also help ensure consistency and ease maintenance for both the RDB and RDBMS, particularly if these were both contained within the scope of, and accessible to, the RDBMS. The operations of the RDBMS would be easier to maintain, optimize, or track if there were means for classifying portions of an 'Update Predicate' into one or more relational expressions, each of which either (1) constrains the logical consistency or other effects of the update action, or (2) restricts the data that is to be affected by the update operation, for this classification would help determine how the RDBMS will manage the update.

The continued linkage between physical location in computer memory and descriptive location in the database by the database system, such as found in Iwata, K. et. al. U.S. Pat. No. 4,514,826, and Matsuda, S. et. al. U.S. Pat. No. 5,247,665, is an approach that, because it is based in whole or in part on information which the RDBMS does not explicitly have access to (an implied structure created and maintained by the administrators, the terms of which are either inaccessible or meaningless to the RDBMS), prevents any RDBMS from attaining either physical data independence, in which the descriptive representation of the data in the database is freed from machine-specific and non-database terms and processes, or logical data independence.

The limited perception that uniqueness properties can be determined for a database was explicitly limited to a 1-tuple condition in Leung, T. et. al. U.S. Pat. No. 5,615,361, because of the separation between a binding explicitly determinable from the database system and that which is actually present in the database's structure. This prevents the user from making changes to the structure, organization, or contents of the database except through indirect database system administration, hinders the database's actual capability to effectively model the information contained within it, and limits the capacity to manage dependent relations or views.

Much of the problem encountered by most RDBMS in handling large databases has been the presence of 'null' elements and columns required by any method that does not effectively manage the data to limit unnecessary duplication, due to the inherent limitations of an implicit and non-represented structure. The opportunity for improving database system performance identified in Leung, T. et. al. U.S. Pat. No. 5,590,324 by exploiting column nullability is just a faint harbinger of the improved administrability, performance optimization, and prevention of update failures that can be obtained when logical data independence can be guaranteed. In many cases, support for logical data independence mitigates or removes the need to support column nullability, and therefore lessens and may even eliminate the need for special optimization techniques such as those identified therein when column nullability is supported by the database system.

The apparatus-specific approach in Huber, V. U.S. Pat. No. 4,918,593 for maintaining dependence is explicitly limited to certain derived columns of base tables. It makes neither provision for derived tables nor discusses any generalizable method independent of the specific data dictionary means for maintaining dependence between tables. The present invention makes use of dependence between tables, and need not be maintained via any particular data dictionary means. Huber makes no claim pertaining either to data independence or to a general method for updating relations.

The value of separating logical and physical data structures is evinced in Kingberg, D. et. al. U.S. Pat. No. 5,734,887, which fails in its approach to free itself of the need for explicit tables, for both mapping the logical to physical combinations and the explicit joins between logical entity types and the physical tables and columns under them. It further fails to make the means for such mapping or the representation explicitly accessible to the RDBMS. Kingberg requires the use of a 'logical data interface' for access to base relations from application programs without explicitly referencing those relations; the approach does not provide a method for updating derived relations.

Only by using an extra stage of providing a completely separate and independent object model does Kawai, K. U.S. Pat. No. 5,717,924 manage to provide a link between a relational database schema and an object model for the information contained within the database schema. Additionally, the stages of managing and administering any modifications to the database schema are not explicitly described in a fashion that uses the logical structure of the schema, and the constraints and processes contained by the relational database system, to manage the modifications directly.

A different approach to the concept of managing relationships amongst base tables, one that consumes additional memory resources and requires additional programming and data entry, is specified in Olson, M. et. al. U.S. Pat. No. 5,566,333. Olson requires a distinct linker table, does not modify relational database or its contained data, and does not address the problem of updates.

Pitt, J. et. al., U.S. Pat. No. 5,493,671, explicitly duplicates the entirety of any merged data, and deals solely with data type differences by direct conversion according to preset means rather than any methodology contained within an RDBMS.

The desirability of allowing logical access, independent of knowledge of the structure of the physical database, is addressed in Maloney, C. et. al. U.S. Pat. No. 5,701,453. Maloney is limited to table pairings, and the use of explicitly overlapping fields, rather than being generalizable either to logically possible combinations or to any representation explicitly available to the RDBMS.

The value of dynamically displaying and updating data is mentioned in Vanderdrift, R. U.S. Pat. No. 5,455,945; however, in that method the accessible data is limited to the primary or base records, is not derived from any logical representation of the database, and does not use the logical constraints and representations of the database but rather depends upon the creation of explicit management records and memory pointers, and tracing them as necessary, thereby increasing the complexity and memory requirements for the system rather than lessening them through symbolic abstraction. Moreover, the method therein does not provide a method which is consistent over data, relations, and constraints; instead, it distinguishes between a 'management record', a function, a filter, and a 'DD' (display and organization rules). And the method neither makes the method accessible within and to the RDBMS, nor uniform across data types, nor separate manipulating the data, functions, and records from preliminarily manipulating the logic to determine whether and how the changes are feasible.

The method identified in Horn, G. et. al. U.S. Pat. No. 5,226,158, may assist in determining the validity of a particular constraint; however, it does nothing with such validity or the constraint itself. Nor does the method therein allow for generalization to means for consistently managing base tables, derived tables, and constraints, as well as any particular constraint.

Review of Certain RDBMS Mechanisms

There are many methods in the art by which RDB updates have been implemented. Relational updates are set transformations, as contrasted with row or record modifications. This fact implies that updates are atomic, i.e., an unrecoverable error of any type requires that the entire update be aborted. Typically, updates are applied in the context of a transaction so that atomicity is insured by a transaction manager or some equivalent software component. The usual method by which either relational update or transaction atomicity is insured is to make all updates to a copy of the data, leaving a copy (known as a 'before image') unmodified. If an error occurs, the unfinished modifications can be discarded and the RDB restored to its original condition using the before image. If the update completes successfully, the modified copy (known as the 'after image') can be used to replace the before image. This technique is often used in a nested fashion so that each update within a transaction has a corresponding before image and after image, as does the entire transaction. Regardless of the particulars of transaction management, the illusion is given that the entire database is transformed from the publicly available version of the data (before image) through a sequence of private after images (each generally hidden from other users) until the transaction completes. If it is successful, the final after image produced becomes the publicly available version of the data. In practice, there may not be a physical after image or before image, but only the appearance of one. Many variations on the method of transaction management exist, but are functionally equivalent to the one described here. See Date, *Introduction to Database Systems*, supra, for a more detailed explanation. The after images of tables modified by a transaction are often checked prior to completing the transaction to determine consistency. Such constraint checks may require reading other tables that have not been modified (i.e., have no after image) within the context of the particular transaction.

Methods for processing a request, whether a data retrieval or a data modification, are generally referred to by the term 'query processing'. The literature pertaining to query processing in an RDBMS is extensive and includes subtopics such as query parsing, internal query representation, optimization, and physical data access methods. A common internal query representation technique is known as a query tree, in which data access methods form the leaves of the tree and successive nodes represent operations on the (possibly intermediate) data. Operations are typically either unary or binary, this being sufficient to represent all relational operators. Every relational request and every predicate formula can be represented by such a query tree as can the definition of every relational view, since a relational view is defined as a named retrieval operation on one or more relations.

A common and well-known technique for processing a retrieval involving a view is to combine the query tree representing the retrieval with the query tree that represents the view definition. In order to use the technique, the RDBMS must maintain dependency information in its System Catalog—that is, information which relates the view to the relations on which its definition depends. Because a view may be defined in terms of relational operations on other views as well as base tables, this dependency information is most naturally stored in the form of a 'dependency tree' with leaf nodes representing base tables and nodes above them representing derived tables. Numerous data structures have been used for storing dependency information, many of which are equivalent to dependency trees in the sense that they are capable of storing precisely the same information but differ in the algorithms used to process that information. Some may contain information in addition to dependency information. Dependency trees are often used to process requests involving views, including modification requests. Most implementations provide only limited support for view modification requests. Furthermore, most implementations use dependency information to propagate modification requests as if they pertained to individual rows of the view, or to substitute the defining retrieval in place of each view reference so that the request ultimately attempts to modify only base relations. This well-known direct substitution technique, and its equivalent methods, result in valid modifications only for certain types of views and such RDBMS implementations typically restrict view updates to those for which it is known to be valid.

The meanings of objects in an RDB (domains, columns, rows, base relations, and derived relations) in an RDBMS are most frequently maintained through methods that are distinct from both the maintenance of the RDB (such as the creation of relations and views) and the processing of requests. For example, object naming conventions, separate data dictionaries, "help" systems, and the like may exist that permit the capturing of object definitions, each of which requires manual steps to create and maintain that are distinct from those steps used to create or modify the object. Such definitions are typically human readable, are not used by the RDBMS in processing requests, and over time diverge from an accurate representation of their corresponding operational definitions. All too often, RDB creators and users rely upon object naming to convey meaning, a practice that is unreliable, inefficient, and cannot be used by the Query Language Processing Engine.

Brief Summary of Current Literature in the Field

Research into the problem of updating derived tables has been limited because of a theoretical misapprehension. One of the theoreticians, in 1988, claimed to have proven that updating views was potentially impossible, or at least that any method that claimed to work for all views was subject to an unpredictable failure. Buff ("Why Codd's Rule No. 6 Must Be Reformulated," ACM SIGMOD Record 17:4, 1988) stated a theoretical proof that a general algorithm for deciding whether or not a view is updateable is undecidable within the predicate logic. This paper has been the dominant and most serious barrier to investigation of the problem of a general algorithm for updating views, let alone arbitrary relations.

However, as Buff does not provide a proof of impossibility within the relational algebra, nor show that the relational algebra and the predicate logic are equivalent, he therefore does not address the embodiment of the invention of this application. Also, Buff never considered those limited implementations of the relational algebra which are necessary to reduce the relational model to practice on physical computers; instead, his paper considers solely the pure mathematics for abstract, theoretical algorithms.

One of the co-inventors was previously so persuaded of the non-updateability of views by E. F. Codd (*The Relational Model for Database Management Version* 2, Addison-Wesley, 1990), in which the author referenced his unpublished algorithm (View Updatability in Relational Databases: Algorithm VU-1, unpublished, 1987) for determining whether or not a view might be theoretically updateable. The referenced algorithm was not, and has not been, reduced to practice, and did not provide any method by which arbitrary views could be updated. Furthermore, Codd does not teach that all views are theoretically updateable, nor does he provide a method by which arbitrary or even specific view updates are to be achieved. Also, the view updates which Codd does describe involve row operations and do not preserve the set semantics of relational operations.

Dayal and Bernstein ("On the Correct Translation of Update Operations on Relational Views", ACM TODS 7:3, 1982) provided a formal treatment of view updating rules for restriction, projection, and join views only. They did not provide a general method for updating views or arbitrary relations.

Keller ("Algorithms for Translating View Updates to Database Updates for Views Involving Selections, Projections, and Joins", Proc. $4^{th}$ ACM SIGACT-SIGMOD Symposium on Principles of Database Systems, 1985) presented criteria for algorithms that would implement a limited class of view updates, and multiple algorithms which satisfy those criteria. A single, general purpose method was not presented (or suggested as even possible), and the semantics of the update operation are not propagated to the base relations.

Nathan Goodman ("View Update is Practical", InfoDB Vol. 5, No. 2, 1990) proposed that the user, in defining a view, be provided with a means for also specifying view-specific methods of updating. No attempt was made to provide a method by which arbitrary views can be updated; the problem of updating derived relations other than views is not discussed. Goodman did refer to well-known methods of updating a few particular types of views using type-specific methods which he recognized as not generalizable. He also identified types of view which he contended required user-defined and type-specific methods for updating, denying the possibility of a generalized algorithm.

Since the Nathan Goodman article, most of the literature on "view updating methods" refers to the propagation of updates from one or more source relations to a physically stored derived relation, and how to most efficiently manage physical aspects of this operation. This has generally been referred to as the problem of updating or managing 'materialized views'. It does not address the problem of updating a derived relation and then propagating the appropriate changes to the source relations; therefore, this body of literature does not bear upon this application.

The ANSI (American National Standards Institute) has published a standard for the syntax and some semantics of the SQL query language; this query language is the one which almost all RDBMS products support. The current (and forthcoming) version of the ANSI SQL standard states explicitly that expressions involving updates of views are not legal expressions in the language except in a limited number of specific cases. The semantics described for updating those limited types of views are, in general, inconsistent with the semantics of updating base relations, resulting in a surprising and non-intuitive behavior from the perspective of users. RDBMS products that support SQL have been required by market pressure to support the syntax and semantics defined in the ANSI SQL standard; the ANSI SQL standard has been and continues to be a barrier to developing (let alone implementing) approaches for general view updating.

C. J. Date (*Introduction to Database Systems*, 6$^{th}$ Edition, Addison-Wesley, 1995, pp. 472ff) describes separate updating procedures for each of certain types of views, but fails to introduce a general approach to updating all relations, whether base or derived; the possibility of updating certain types of views is explicitly denied. Also, Date provides separate procedures for various types of updates (for example, insert, delete, or modify). The limits on view updatability imposed by the ANSI SQL standard mentioned above are discussed, which may further have seemed to validate a mistaken belief in the non-updateability of views.

There is a need for maintaining and tracking, preferably by a symbolic abstraction such as by means of relation predicates, the relationships or dependencies among a derived relation and its source relations, so when a source relation is changed the derived relation is also updated. Also needed is a means to derive a relation predicate for a derived relation from the combination of relation predicates for its source relations, predicates for constraints on those relations, and the predicates for the relational operations on source relations used to define the derived relation; once derived, it would be further desirable to make the same accessible to the RDBMS and its programmers or even users. Also desirable would be means to decompose a relational expression involving a derived relation into a logical combination of one or more relational expressions, each of which is either a relation predicate of a source relation or a predicate corresponding to a constraint on one or more source relations. Such means should permit successive decomposition of a relational expression, so when the result of one step of decomposition generates one or more relational expressions that themselves involve a derived relation, each of these is further successively decomposed, leading finally to a logical statement whose every element is either a relation predicate of a base relation or a predicate corresponding to a constraint on one or more base relations.

What is needed is a common and uniform method that can (i) provide uniform symbolic abstraction of data, relations, and constraints comprising an RDB managed by an RDBMS, (ii) allow both users and the RDB and RDBMS to use the most effective of either logical manipulation of the symbolic abstractions or manipulation of the same symbolic abstractions' instantiation to reason with and manage data elements and relations, and (iii) provide access to or an update on an arbitrary relational expression as a symbolic abstraction and thence on the physically-embodied data and relations for which the symbolic abstraction stands, whether the data and relations referenced by that expression are views, other types of derived relations or base relations.

SUMMARY

The present invention is directed to a method that satisfies this need (defined in the preceding Background section). The method describes how a relational database management system can create and maintain relation predicates; and access and update views and relations in a relational database through symbolic abstraction and without having to distinguish between base and derived data; the method thereby providing, to both the RDBMS and user, for derived tables and data the same access and updating capabilities currently provided for users or designers for base tables and data.

The embodiment of the invention explicitly (that is, within and accessible to the relational database management system) catalogues denotations, which are symbolic abstractions with meaning for both the user and the RDB and RDBMS, where the denotations are descriptions of the instantiation of data elements, relations and constraints managed by the system. These denotations are expressed and manipulable as relation predicates. The embodiment further explicitly makes these relation predicates part of, accessible to, and manipulable by the relational database management system, rather than merely inherent in the relational database's structure and the separately-programmed rules managed by the relational database management system.

The embodiment further tracks dependencies for all derived relations, processes relational operations on the RDB through relational predicates, and links and queues validity constraint checks run by the RDBMS to resolve at the appropriate time, all separately from any physical, environmentally-dependent, computer and hardware management concerns.

This embodiment of the invention enables maximum flexibility, minimum maintenance, and highest performance for any relational database management system incorporating it. It also frees users and relational database management systems from many of the difficulties of accessing and updating derived tables, and makes such access and updating predictable. If the design of the database is consistent with the strict definition of relations as specified by the relational model, it also guarantees that such access and updating is consistent with the relational algebra and happens in an intuitive manner. This embodiment of the invention furthermore leads to a minimal use of physical memory by a RDBMS by eliminating logically-unnecessary duplication of base data elements. (Security, communication, or hardware requirements, concerns beyond the scope of the relational database management system though it must cope with their specific implementation, may still drive some duplication.) This also creates, in the preferred embodiment, provable, full data independence between data and its physical storage for any relational database management system incorporating the embodiment of the invention, and provides uniform semantics for operations on base, derived, or commingled base and derived tables, and data. It further provides improved consistency, maintainability, data integrity, and recoverability of single or distributed relational databases, and finally provides a way to minimize relational database management system maintenance and eliminate update-caused rollbacks.

The brief summary of the invention is provided so that the nature of the invention may be readily comprehended. A more precise and fuller comprehension may be obtained by reference to the following detailed description of the invention in connection with the appended and associated drawings.

DESCRIPTION OF THE SEVERAL VIEWS OF THE DRAWINGS

FIG. 4 is an example of a relation expressed as a table.

FIG. 6 is an example of an update operation in the preferred embodiment.

DETAILED DESCRIPTION OF THE INVENTION

Figure 1:
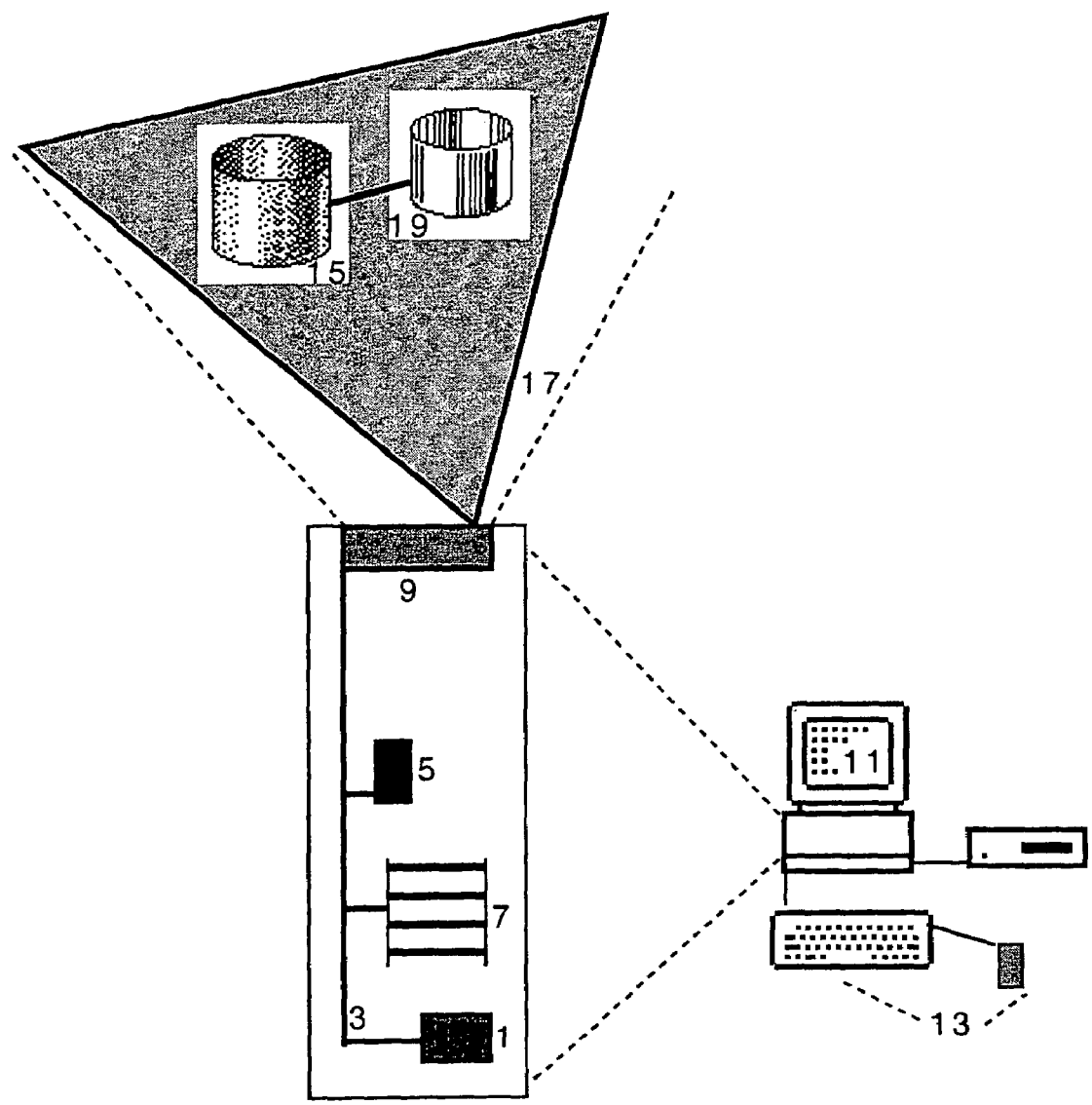
FIG. 1 is an abstraction of a computer system incorporating the preferred embodiment, with processing, memory, input/output, and software sub-systems and means.

The method described in the claims below works for and in a Relational Database Management System ('RDBMS'), running on a computer having memory, a processor, and input and output means. An RDBMS is a software program that runs on the computer, using the latter's memory and processors for physically storing and manipulating data, and using the latter's input and output hardware for translating between physical and logical representations and back again. This software program includes an RDBMS as described in the previous sections.

Implementation

This embodiment of the invention may be implemented in a single computer, a distributed computer system, or in an embedded-chip. The preferred embodiment comprises one or more software systems designed for an SQL-based RDB and RDBMS, containing a System Catalog (SC) and Query Language Processing Engine (QE). Alternative embodiments implement either or both the SC and QE, or the entire invention, external to the RDBMS, or in any internal or external combination. In this context, a software system is one or more software programs and associable hardware memory (random-access, dynamic, static hard disk or disk array). A software system should be understood to comprise a fully working software embodiment of one or more functions, which can be added to an existing computer system (to provide new or improved functionality) or to a new general computer system (to provide a special function computer system with the software system's incorporated functionality). Software systems are generally layered, as are RDBMS. The lowest layer generally is an operating system ('OS') that manages hardware operations. Additional layers may provide specific computational or processing functionality, a graphical user interface, specific input/output capability for particular scientific or data acquisition or display hardware, or inter-system communication and sharing capability (i.e. WAN, INTERNET, or non-wire-based, communications). These software systems provide a foundation on which additional software systems can be built or changes made to the current set.

A software system can thus be understood as a software implementation of a function which, when added to or included within a computer, provide new, specific functionality to a general-purpose tool. The software system for this embodiment of the invention may be distributed by computer-usable media such as diskettes, CD-ROM or DVD disks, or electronic signals over a remote connection (i.e. downloaded over INTERNET-based electronic distribution). Also, it should be understood that the interface between one software system and another meant to work with it should be well-defined and shared, and it should be understood in the context of this embodiment of the present invention that delineations between software systems (e.g. RDBMS from RDB from OS) are representative of the preferred embodiment. However, the invention may be implemented using any combination or separation of software systems and hardware.

The preferred embodiment of the invention comprises a set of software systems for accessing and updating relations, both base and derived, in a relational database. A single computer system incorporating the preferred embodiment is shown in FIG. 1, which includes a central processor 1, connected by means of a bus 3 to read only memory ('ROM') 5, random-access memory ('RAM') 7, and static memory 9. The static memory may comprise any of the following, alone, in combination, or their functional equivalent: hard disk, disk array, flash memory, bubble memory, chip-based memory, magnetic tape, optical disk. When the computer is operating the method will be part of the software systems (including the RDB and RDBMS) stored in RAM and static memory depending on the operating system's memory management. The computer system in FIG. 1 is also connected to both an output system, which comprises at least one display 11 or other output device, by which the computer presents information to the user, and at least one input system 13, which comprises at least one or more devices by which data is input to the computer, which may include but are not limited to: a keyboard, a mouse, a pointing device, a voice sensor, a graphic input tablet, a touch screen, a touch screen overlay, a joystick, a track ball, a light pen, a scientific data sensor, or a numeric keypad. In computer's memory are the RDB 15, RDBMS 17, and software implementation of the method 19.

Figure 2:
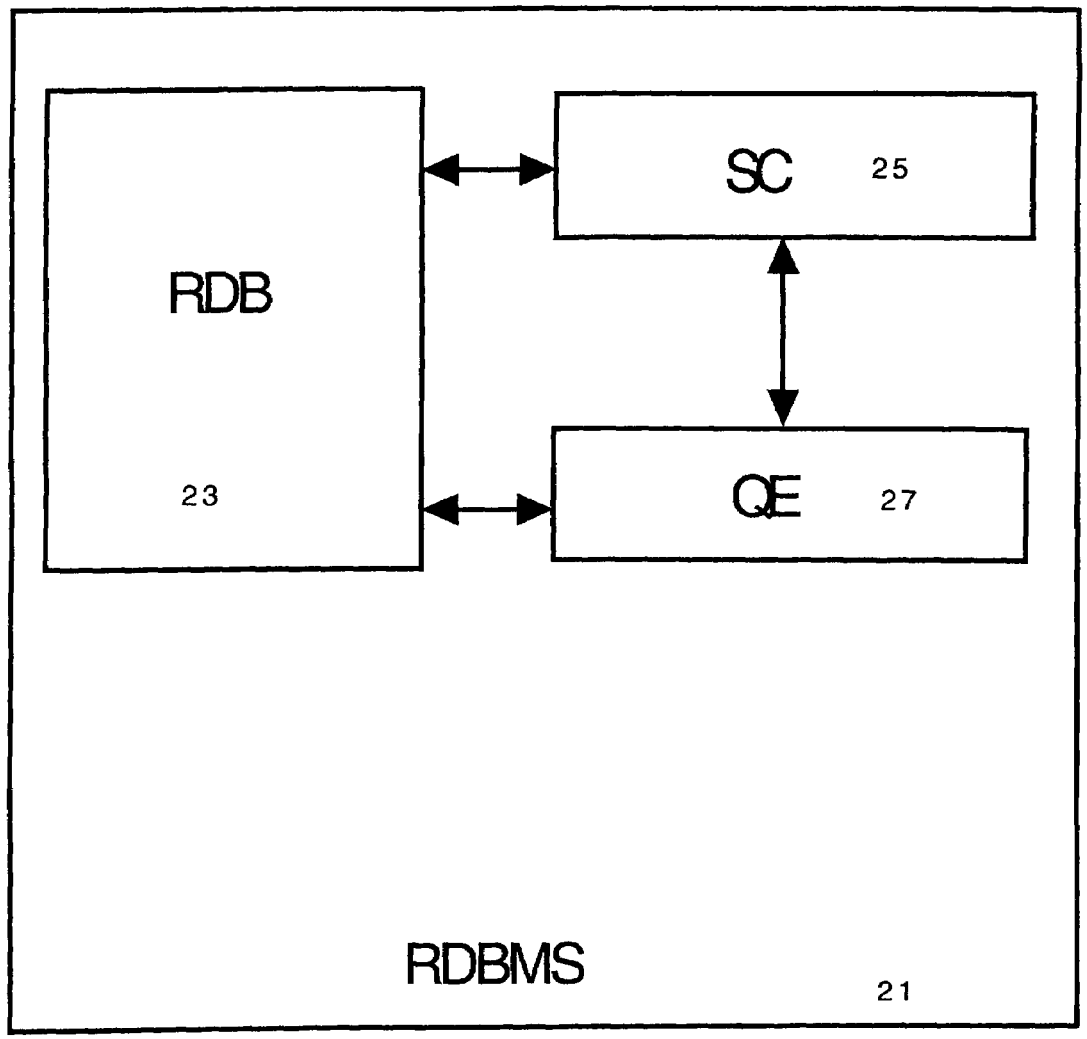
FIG. 2 is an instantiation of an RDB and RDBMS, with subordinate features belonging to the latter of a System Catalog (SC) and Query Language Processing Engine (QE).
Figure 3:
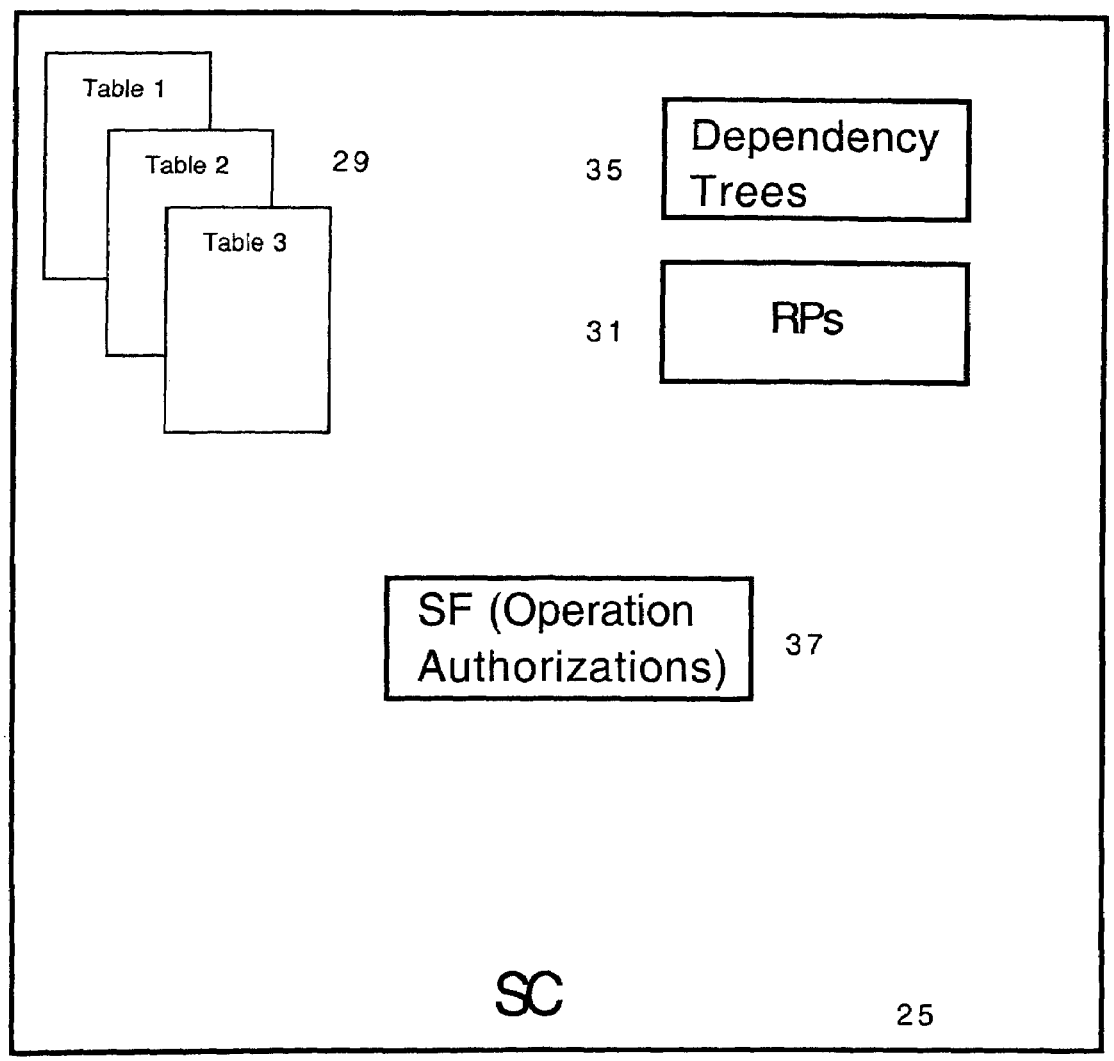
FIG. 3 is a more detailed view of the System Catalog, with tables to store RDB details, including constraint definitions for domains, columns, tables, and the database (i.e., multi-table constraints), Relation Predicates (RPs), Dependency Trees, and operation authorizations ('SF').

The computer system contains at least one RDB and RDBMS (FIGS. 2, 21 and 23, respectively); to be useful, the RDB must be 'populated' (i.e. having data elements entered and relationships defined). The RDBMS contains an SC 25 that describes operations, elements, contents, and/or structure of the RDB accessible to the RDBMS, and a QE 27 that defines operations performable within the RDBMS. In the preferred embodiment (FIG. 3), the SC includes tables 29 which store, for example, constraint definitions for domains, columns, tables, and the database (i.e., multi-table constraints), Relation Predicates (RPs) 31, and Dependency Trees 35 which define the dependencies between Derived Relations and their Source Relations, in addition to those which contain definitions of the physical and logical organization of those objects and operation authorizations ('SF') 37, to protect against unauthorized or inadvertent alteration. The SC may be fully integrated within the RDBMS, may be a user supplied augmentation of an existing SC, or may be a facility external to the RDBMS (as, for example, external data files, data dictionaries, information embedded in programs, and so on, along with means to use the information contained therein in an appropriate manner with the RDBMS). The QE accepts requests in one or more query languages (e.g., SQL) via either user input or programmatic interface. When a Relation (an example Relation is shown in FIG. 4) is created or modified (e.g., by adding a constraint), the RDBMS derives and stores the resulting RP in the SC. When a Derived Relation is created, the QE creates and stores a Dependency Tree along with the definition of the Derived Relation in the form of both query language text and the query tree.

This invention can be implemented entirely within the RDBMS or, in the alternative, may be separable and interface with the RDBMS. This separation could take any of a number of forms, with the method being a front end to the RDBMS, a gateway that sits between the RDBMS and the user or application seeking to access the RDB, or as an augmentation to the RDBMS that is invoked from and by the RDBMS (via triggers, exits, hooks, APIs, and the like).

Overview of Creation and Maintenance of Relation Predicates

A Relation Predicate for a particular Base Relation consists of the logical conjunction of the following:
- each domain constraint over which an attribute (column) of the Relation is defined;
- each column constraint pertaining to an attribute of the Relation;
- each row constraint pertaining to rows of the Relation; and,
- each multi-row constraint pertaining to rows of the Relation.

A Relation Predicate for a particular Derived Relation, where that relation is derived via relational operations (restriction, projection, join, union, etc.) on one or two other relations, is defined in terms of the Relation Predicates for those one or two other relations as specified in Table 1 below. (In Table 1, R1, R2, R3, and R4 are arbitrary relations; PR1, PR2, PR3, and PR4 their respective Relation Predicates; and *PR2 is PR2 with specified modifications. Also, P5 is an arbitrary well-formed predicate, 'AGGREGATE' is any valid aggregate operation, and 'NAME' is an arbitrary column label.) The Relation Predicate includes as conjuncts any independently defined multi-relation constraints that reference only the relations involved in the relational operation by which the Derived Relation is formed. It does not include any multi-relation constraints that reference a relation not involved in the relational operation by which the Derived Relation is formed. Just as arbitrarily complex Derived Relations can be formed by successive combination using multiple relational operations, the corresponding Relation Predicate can be derived by successive application of the definitions or "rewrite rules" in Table 1.

relation definition are modified, and is eliminated, either logically or physically, at such times as R1 is destroyed. Creation, modification, and destruction of Relation Predicates, collectively referred to as Relation Predicate definition updates, may be triggered by, for example, signals received by the RDBMS (or other suitable software component) from a suitably authorized user, alteration of appropriate portions of the SC, or other means which will be well-known to those familiar with the art, any of which indicate that relations and constraints have been created, modified, or destroyed. In an alternative embodiment, Relation Predicate definitions are updated periodically. In a further alternative embodiment, Relation Predicate definitions are updated as necessary and appropriate when those Relation Predicates are needed for some particular purpose.

In the preferred embodiment, the creation and modification of Relation Predicates is triggered by the creation and modification of relation and constraint definitions, and more specifically by the storage of those definitions in the SC. (In an alternative embodiment, the algorithm for creation and modification of Relation Predicates is an integral part of the algorithms for creation and modification of relation and constraint definitions, possibly resulting in the storage of the Relation Predicate in the SC.) The SC contains one or more tables which records the objects (columns, domains) upon which each relation depends, and the set of such objects on which R1 depends is retrieved from the SC.

If R1 does not depend on other relations, the constraint definitions which reference either R1 or these objects, including domain, column, row, and multi-row constraints, are then retrieved from the SC, said definitions being stored in as logical predicates, and each being logically conjoined.

If the R1 depends on one or more other relations, the Relation Predicates for these relations and the query tree that defines R1 are retrieved. The query tree is converted into a

TABLE 1

| RELATIONAL OPERATION | RELATIONAL EXPRESSION | LOGICAL EXPRESSION | MULTI-RELATION CONSTRAINT |
| --- | --- | --- | --- |
| PRODUCT | R2 PRODUCT R3 | PR2 AND PR3 | |
| RESTRICT | R2 RESTRICT P5 | PR2 AND P5 | |
| PROJECTION | R2 REMOVE COL-A | *PR2[<all terms involving COL-A deleted>] | EXISTS(R2.COL-A) AND <all multi-column constraints involving R2.COL-A> |
| UNION | R2 UNION R3 | PR2 OR PR3 | |
| DIFFERENCE | R2 MINUS R3 | PR2 AND NOT PR3 | |
| INTERSECT | R2 INTERSECT R3 | PR2 AND PR3 | |
| EXTEND | EXTEND R2 ADD P5 AS 'NAME' | PR2 AND P5 | |
| 'AGGREGATE' | SUMMARIZE R2 BY (COL-A) ADD 'AGGREGATE'(COL-B) AS 'NAME' | PR2 AND P('NAME') | FORALL R2.COL-A, R4.NAME = 'AGGREGATE' (R2.COL-B) AND R4.COL-A = R2.COL-A |

A number of less-preferred embodiments would incorporate different sub-sets of the definitions in Table 1. Some might choose not to implement a column (for example, not defining the rules for any Logical Expression); some might not choose to implement a row (for example, not defining the rewrites for the Relational Operation 'EXTEND').

In the preferred embodiment of the present invention, the Relation Predicate for a particular Relation 'R1' is derived and stored in the SC at the time R1 is created, is appropriately altered at such times as the set of relevant constraints or the nested, linear representation containing only unary and binary relational operations (restriction, projection, product, union, and so on) and relation references (e.g., relation name or relation variable) as operands using means well-known to those familiar with the art. Each operand and its corresponding operands form a relational expression and are replaced with the corresponding logical expressions. In the preferred embodiment, Table 1 above is stored (for example, in the SC, embedded in the program, or other obvious means) and the replacement accomplished by lookup in Table 1 and substitution in the expression. The definitions of any multi-relation (i.e., database) constraints that reference only those relations already referenced within the expression are also retrieved (e.g., from the SC) and logically conjoined with the existing predicates.

In the preferred embodiment, modification of a relation definition (e.g., adding a new column), adding a new constraint, dropping an existing constraint, or modifying an existing constraint may be handled by dropping the definitions of any existing relation predicates that depend on the objects referenced by that relation definition or those constraints and creating those relations predicates again using the methods described for creation of a relation predicate. In an another embodiment, the affected portions of those relation predicates are appropriately either replaced with the appropriate updated predicates or deleted; numerous means for identifying the dependant portions of a predicate and performing expression substitution of those dependant portions with updated versions are well-known to those familiar with the art.

For example, if the relation 'Date' discussed above is created, the SC will then contain for 'Date' a symbolic representation of the row constraint 'FORALL (x, y, z) IN 'Dates', (x IN 'Months') AND (y IN 'Days') AND (z IN 'Years')'. The SC will also have a symbolic representation of the domain constraints for 'Months' and 'Days' and 'Years' corresponding to 'FORALL x in 'Months', (x IN 'Numerals') AND ($1<=x<=12$)'; 'FORALL y in 'Days', (y IN 'Numerals') AND ($1<=y<=31$)'; 'FORALL z in 'Years', (z IN 'Numerals') AND ($1999<z<2100$)', where 'Numerals' is a fundamental domain in the sense that the RDBMS inherently knows how to test membership for that domain given a particular data value. The SC will have a symbolic representation of the row constraints for 'Date' corresponding to a set of conjuncts properly constraining the value of 'Days' according to the value of 'Months', e.g. 'FORALL (x, y, z) IN 'Dates', (x=1 IMPLIES y<=31) AND (x=2 IMPLIES y<=29) AND (etc.)'. The SC will also have a row constraint for 'Date' corresponding to 'FORALL (x, y, z) IN 'Dates', ((x=2) AND (z modulo 4=0)) IMPLIES (y<=28)'. These constraints are retrieved from the SC and logically conjoined. After collecting terms, the resulting Relation Predicate for 'Dates' is:

'FORALL (x, y, z) IN 'Dates', (x IN 'Months') AND (y IN 'Days') AND (z IN 'Years') AND ((x IN 'Numerals') AND ($1<=x<=12$)) AND ((y IN 'Numerals') AND ($1<=y<=31$)) AND ((z IN 'Numerals') AND ($1999<z<2100$)) AND (x=1 IMPLIES y<=31) AND (x=2 IMPLIES y<=29) AND (etc.) AND (((x=2) AND (z modulo 4=0)) IMPLIES (y<=28))'

Similarly we might, for example, have determined that relations 'Employees' with columns (ENUM, ESAL, EDEPT) and 'Departments' with columns (DNUM, MNUM) and have the Relation Predicates, E(x, y, z) and D(u, v) respectively. For clarity, we abbreviate uniqueness constraints or predicates, the form of which is given in Table 1, as 'Unique(x)'. E(x, y, z) and D(u, v) are then, for purposes of illustration, as follows:

'E(x, y, z)='FORALL (x, y, z) IN 'Employees', (x IN 'Employee_Numbers') AND (y IN 'Salaries') AND (z IN 'Department_Numbers') AND ((x IN 'Numerals') AND (0<x<100000)) AND ((y IN 'Numerals') AND (y>0)' AND ((z IN 'Numerals') AND (0<z<1000)) AND Unique(x) AND (EXISTS(Departments.DNUM=z)' and

'D(u, v)='FORALL (u, v) IN 'Departments', (u IN 'Department_Numbers') AND ((u IN 'Numerals') AND (0<u<1000)) AND Unique(u) AND (v IN 'Employee_Numbers') AND ((v IN 'Numerals') AND (0<v<100000)) AND EXISTS(Employees.DNUM=u)'

The Relation 'Managers_Salaries' with columns (DNUM, MNUM, ESAL) is derived from 'Departments' and 'Employees' by forming the product, restricting to those rows for which (MNUM=ENUM) and (DNUM=EDEPT), and projecting DNUM, MNUM, and ESAL. The effect of three relational operations are given in Table 1 and, on successive application and rearrangement of terms, give the following Relation Predicate MS(u, x, y) for the Derived Relation 'Managers_Salaries':

'MS(u, x, y)=FORALL (u, x, y) IN ('Employees' PRODUCT 'Departments'), (x IN 'Employee_Numbers') AND (y IN 'Salaries') AND (z IN 'Department_Numbers') AND ((x IN 'Numerals') AND (0<x<100000)) AND ((y IN 'Numerals') AND (y>0)' AND Unique(x) AND (u IN 'Department_Numbers') AND ((u IN 'Numerals') AND (0<u<1000)) AND Unique(u) AND EXISTS (Employees.DNUM=u) AND EXIST(z) AND EXISTS(Employees(x, y, z)) AND ((z IN 'Numerals') AND (0<z<1000)) AND (EXISTS (Departments.DNUM=z) AND EXISTS(v) AND EXISTS(Managers(u, v)) AND (v IN 'Employee_Numbers') AND ((v IN 'Numerals') AND (0<v<100000)) AND (x=v) AND (z=u)

Creating Augmented Derived Relation Definitions

One objective of this method is to enable the RDBMS to augment derived relation definitions with a computable mapping between the columns of the derived relation to columns of the base relations on which it is defined ('Mapping'). The mapping from source columns ('$x_1$','$x_2$','$x_3$', . . . '$x_n$') to a particular derived relation column ('$y_1$') may be represented symbolically as a function '$y_i = f_i(x_1, x_2, x_3, \ldots x_n)$', this definition of this function being given normally in the course of defining the derived relation. In order to update a particular source column ('$x_i$') given a new value of a particular derived relation column, an inverse function definition (or its equivalent) is required and may be represented symbolically as a function '$x_i = g_i(y_j)$'. In the case where the derived relation is created entirely from a relational operation on one or two source relations, the relationship is just '$x_i = y_j$' (a 'simple map'). The set of inverse functions $g = \{g_i(\ )\}$ provides a method of computing the values of source columns from the values of derived columns. Every derived relation may be derived from repeated application of the relational operations (each of which is either unary or binary) on a finite set of source relations, such a definition of the derived relation most often being represented internally as a query tree.

In the preferred embodiment, the Mapping is fully determined by the information in the query tree and depends on the relational operations of restrict, product, union, set difference, intersection, join, and projection. The method proceeds from the base relations up through the defining query tree, combining the columns of each source relation ('$S_1$', '$S_2$') in accordance with the relational operation designated by a node of the tree to produce the derived columns of the derived relation ('D') and therefore the function which defines the mapping between a derived column and a particular set of source columns. This details on determining this Mapping are as follows.

For each node in the query tree, traversing the tree from the bottom up, the function is identified that defines values of columns of the derived relation in terms of values of the corresponding source relations.

For each such mapping function, the corresponding inverse function is then found:

(a) If the relational operation is a 'restrict' or 'product', the columns of the derived relation map identically to those of the source relations. Thus $S.x_i=D.y_j$ for each column in each S. Additionally, if the relational operation is a 'two-variable restrict' sometimes called a 'join condition' then both variables of the join condition map to the same derived relation columns. For example, if '$S_1.x_1=S_2.x_2$' and $S_1.x_1=D.y_2$, then $S_1.x_1=D.y_2$ is added to the map.

(b) If the relational operation is a 'union', 'set difference', or 'set intersect', the columns of the derived relation map to the columns of both the source relations. Thus, given a value of a column $D.y_i$, $S_1.x_i=D.y_i$ for each column in $S_1$ and $S_2.x_i=D.y_i$ for each column in $S_2$.

(c) If the relational operation is 'project', then for each column $S_2.x_k$ in the source that is eliminated by projection and for which a default constant 'c' or default function 'def($\{z_i\}$)' (where $\{z_i\}$ is a set of function arguments) has been defined, the map is defined as '$S_2.x_k=c$' or '$S_2.x_k=def(\{z_i\})$'.

This procedure results in each column of the final relation (represented by the root node of the query tree) being specified in terms of columns of the relations represented by leaf nodes of the query tree, the function being given by function composition (nested functions) as the tree is traversed from leaves to root. Tree traversal is a common and well-known procedure to those skilled in the art with a number of readily accessible programming methods enabling it. (E.g., see Donald Knuth, *The Art of Computer Programming Vol. 1*, Addison-Wesley, 1998, ISBN 0201485419)

The inverse function composition is then derived so that the value of each column of a relation represented by a leaf node of the query tree can be found given a value of one or more columns of the relation represented by the root node of the query tree. This derivation can come from, for example, a pre-prepared table listing known functions and their inverses, from user entry, or from inductive function derivation (from the function definition and possibly certain constraints), and functional combination, all techniques being standard methods well-known to those skilled in the art of computer programming.

In a final step of the method, the Mapping so derived is stored in the SC and indexed by, for example, derived relation name, source relation name, and column name.

In an enhancement to the preferred embodiment, user supplied or system supplied names of columns (known also as 'renaming', or supplying a 'column alias' or 'synonym') are taken into account in the mapping. For example, a view of the 'Employees' relation might be created restricting salaries to those greater than $100,000. The user might then give the column derived from the source column 'ESAL' a more descriptive name such as 'HIGH_SALARIES'. This enhancement might be implemented, for example, by simple substitution of the supplied name in the mapping in place of the original column name or symbol, or by any of a number of other methods that will be obvious to those familiar with the art.

In a further enhancement of the preferred embodiment, computed columns are taken into account and the functional relationship between source columns and derived columns is recorded as part of the mapping information. Computed columns are derived from one or more source columns by a well-defined computational procedure or function that is supplied by the creator of the derived relation at definition time or by a subsequent modification of that definition. For example, multiplication by a conversion factor (12) might be used to convert monthly salaries ('ESAL') in the 'Employees' relation into yearly salaries in the derived relation. As a further example using the same relation, salaries might be converted from a numeric quantify into a character string and the constant string '$/YR' might be concatenated onto the end.

To complete the mapping between derived relation columns and source relation columns when the derived column is defined as a function of one or more source relation columns, the inverse of the computed column function must be recorded or derived from the derived relation definition. In one embodiment, the inverse function is computed automatically from the supplied function definition using, for example, an equation solver or functionally equivalent software means. In another embodiment, the inverse function definition is determined by manual means (for example, supplied by a user such as the definer of the derived relation). In a further embodiment, a combination of automatic and manual means may be used. For example, manual means might be used where automated means for a particular function would be overly complex or computationally expensive. Alternatively, automated means might be used where determination of the inverse function would be too difficult or unreliable for implementation via manual means. In yet a further embodiment, an effective, alternative inverse function may be supplied by manual means for column derivation procedures that do not have a unique inverse function. In yet a further embodiment, the combination of the current values of the source and derived columns, the updated values of the derived columns, and the functional relationships among them (possibly including certain integrity constraints), are used in conjunction with software means commonly known to those skilled in the programming arts, such as numerical approximation techniques, constraint programming, matrix algebra, linear programming, and the like, to determine acceptable values of the updated source columns.

Major Steps of The Relation Update Algorithm

Figure 5:
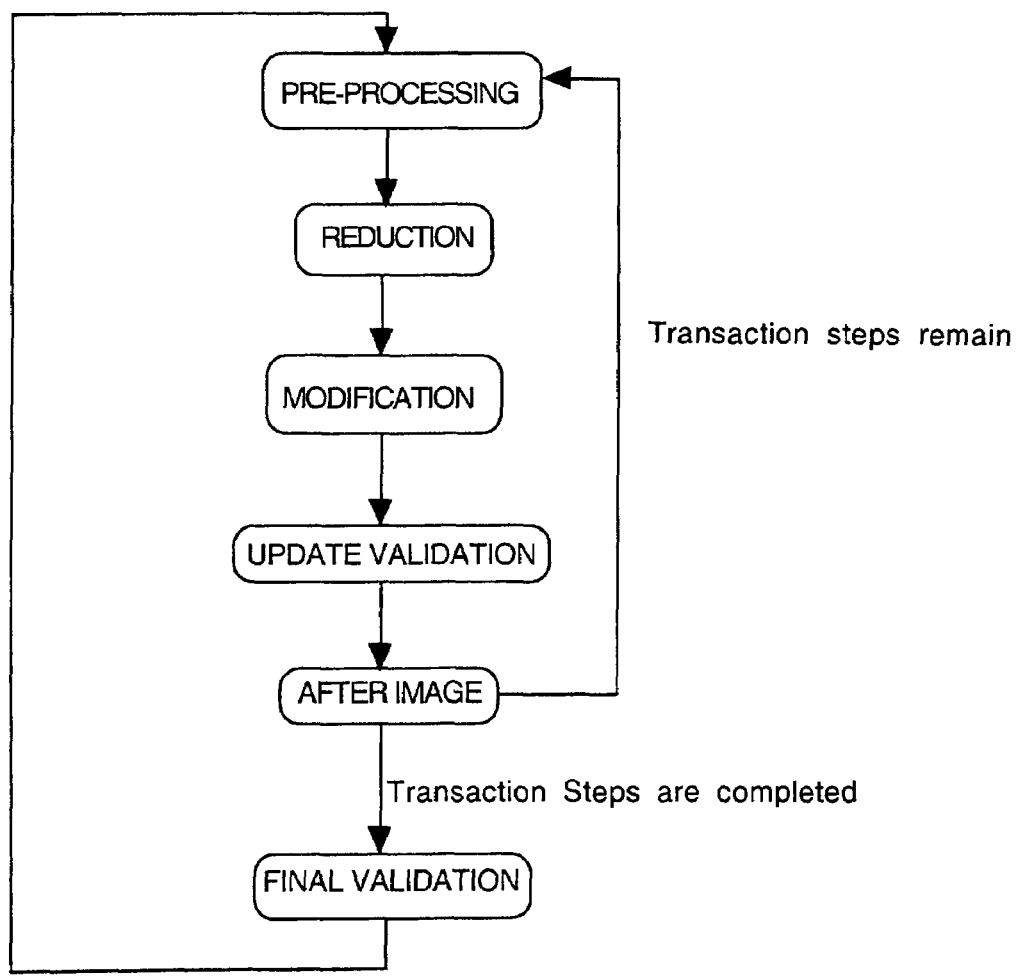
FIG. 5 is a flowchart of the main steps of the method detailed below.

In the preferred embodiment of the invention, the fundamental RDBMS modification functions are handled uniformly through an identical set of steps for each transaction, including those which modify the RDB directly, whether using the Relational Predicates to modify the structure or the data elements to modify the contents. FIG. 5 is a flowchart showing an abstraction of the major steps of the method. These steps are: (1) Pre-Processing ('before image' creation or identification, and preparation of the query language request), (2) Reduction (creation of the Target Relation Predicate and rewriting the expression), (3) Modification (updating the 'after image' of the affected relations, an example of which is given in FIG. 6); (4) Update Validation (validate the success of the update), and (5) After Imaging (saving the current 'after image' of each affected Base Relation for subsequent processing), and (6) Final Validation (multi-relation constraint checks). In the preferred embodiment recursive rather than iterative repetition is used, particularly for traversing the query tree. Each of these is further described below, and they may be implemented in any language or using any functional algorithm known to those skilled in the art.

Pre-Processing

The objective of Pre-Processing is to create or identify the current 'before image' and to prepare the query language request. If the query language request is the initial request in a transaction, the current 'before image' is just the current committed image of the database; otherwise it is identified as the most recent 'after image' of each Base Relation resulting from previous modification requests within the current transaction. Using methods well-known to those familiar with the art, the syntax of the query language request is validated via the appropriate query language parser and all object references are validated. If there are syntactic or reference errors, the parser handles the error in the usual manner for the particular RDBMS (e.g., returning an error to the user or requesting program).

If there are no errors, the parser generates an internal representation of the request which, in the preferred embodiment is a query tree.

If the operation associated with root node of the query tree is a Retrieval function, the query tree is processed by the QE ('query engine') using methods that will be well-known to those familiar with the art.

If the operation associated with the root node of the query tree is a modification request function (e.g., a Delete function, an Insert function, or an Update function), the function identification is saved, the target of the function is identified (the 'Target Relation') and that relation denotation is pushed onto the Target Relation Stack ('TRS').

The query tree is separated into two components, one representing the target relation (the 'Target') to which the modification request is to be applied, and one being a query subtree representing the source relation (the 'Source Query Tree'); the source relation may well be, for example, a derived relation, a base relation, or a relational 'constant'. The Target is simply the target relation reference identified in the modification request, and in particular represents the 'after image' of the target relation. The Source Query Tree is separated into two further subquery trees, one representing a relation that is to be subtracted via set difference from the target relation (the 'Delete Query Tree') and one that is to be added via set union to the target relation (the 'Insert Query Tree'). Both the Delete Query Tree and the Insert Query Tree represent retrieval functions and each relation referenced within them denotes the current 'before image' of that relation, this being the 'after image' of that relation resulting from the most recent modification request (if any) within the current transaction and otherwise the initial image of the relation as of the beginning of the transaction. The Target, the relation produced on execution of the Delete Query Tree (the 'Deleted Relation'), and the relation produced on execution of the Insert Query Tree (the 'Inserted Relation') each have the same columns.

Reduction

The objective of Reduction is to obtain the Relation Predicate corresponding to the Target, create the Target Relation Predicate, and to rewrite the expression so as to be able to apply each appropriate portion of the derived source relations (obtained by processing the Delete Query Tree and the Insert Query Tree) to one of those Base Relations from which the Target is derived and in the subsequent Modification Step. The following steps are performed:

The Relation Predicate corresponding to the Target (the 'Target Relation Predicate') is obtained from the SC by lookup.

The Mapping between the Target and each Base Relation on which it depends is obtained from the SC by lookup.

For each Base Relation referenced in the Target Relation Predicate, all terms pertaining to that Base Relation are collected with all single predicate variable and constant terms grouped together and all multi-variable terms grouped together ('Augmented Base Relation Predicate').

For each Base Relation referenced in the Target Relation Predicate, all multi-relation constraints that reference the Base Relation are retrieved from the SC by lookup.

Modification

The objective of Modification is to apply the appropriate portion of the Deleted and Inserted Relations to the appropriate Base Relation of those referenced in that Target Predicate. The following steps are performed:

The QE processes the Delete Query Tree and the Insert Query Tree, creating Deleted and Inserted Relations respectively from the current 'before image' of the referenced Base Relations. Either Deleted Relation or Inserted Relation or both may be empty sets of rows.

For each Base Relation in the Target Predicate:
  (a) The portion of the Mapping relevant to the Base Relation is identified.
  (b) The partition of the Deleted Relation corresponding to those columns that map to columns of the Base Relation is created ('Deleted Partition').
  (c) The partition of the Inserted Relation corresponding to those columns that map to columns of the Base Relation is created ('Inserted Partition').
  (d) As an optional step, any so-called 'before actions' triggered by the relevant update function may be executed at this point.
  (e) The current 'after image' of the Base Relation ('Base Relation AI') is modified through the relational operation of set difference, by removing from Base Relation AI the rows in Deleted Partition. This substep is the 'Deletion Phase' for this Base Relation.
  (f) The after image of the Base Relation ('Base Relation AI') is further modified through the relational operation of union, adding to Base Relation AI the rows in Inserted Partition. This substep is the 'Insertion Phase' for this Base Relation.
  (g) The logical truth of the Augmented Base Relation Predicate is determined for each row in Inserted Partition. If the value thus obtained for any row is 'False', the logical truth value of that Augmented Base Relation Predicate within the Target Relation Predicate is replaced with the logical constant '(False)' and otherwise is replaced with logical constant '(True)'.

Update Validation

The objective of Update Validation is to process any post update triggers and to confirm that the attempted modifications are consistent with the definitions of the relations and any relevant constraints. For each Base Relation in the Target Relation Predicate, any post update triggers (as, for example, obtainable from the SC by lookup) on the Base Relation are processed and applied to the appropriate 'after image'.

Next, the Target Relation Predicate is evaluated for its logical truth value, taking into account the truth values obtained in prior steps, and any previously unevaluated multi-variable terms being evaluated at this time. If the resulting logical truth value is 'False', an constraint violation error is raised, the 'before image' of each Base Relation is restored, and the update aborted.

After Imaging

The objective of After Imaging is to save the after image of the Modification Step, in preparation for subsequent transaction steps (wherein it becomes the relevant 'before image' for that subsequent transaction steps that affect that relation) or transaction commit. Accordingly, for each Base Relation in the Target Relation Predicate, the method saves the Base Relation AI in computer storage for subsequent processing.

The transaction steps or modification requests continue processing, repeating Pre-processing, Reduction, Modification, Update Validation, and After Imaging as necessary until there are none left to process and the transaction has been completed. In the preferred embodiment, most such iteration is recursive from the highest derived relation to all base relations. The cross-substitution of iterative and recursive functions are standard techniques well-known to those skilled in the art of computer programming.

Final Validation

Prior to a transaction commit, the QE must validate all multi-relation constraints, including those that have been identified and deferred during Reduction and Modification. If a relation referenced in a multi-relation constraint has been modified by the current transaction, the 'after image' of that relation is read in checking the constraint. Otherwise, a previously committed, database consistent version of the relation is read.

For each Target Relation Predicate that has been processed as a part of the transaction:
  (a) If the logical truth value of the Target Relation Predicate has evaluated to 'True' and there have been no other errors, each multi-relation constraint that references a Base Relation found in the Target Relation Predicate is checked. If any multi-relation constraint check fails, an constraint violation error is raised, the pre-transaction 'before image' of each Base Relation is restored, and the transaction aborted.
  (b) If no errors have been raised, the modification request is complete and the RDBMS may commit the transaction.

This ends the transaction, setting the RDBMS ready to respond to the next.

Other Embodiments/Enhancements

As an enhancement to the preferred embodiment, single-variable terms of each Augmented Relation Predicate are checked when each Inserted set of rows is derived. If all rows are logically consistent with these terms of the Augmented Relation Predicate, the update is flagged as conditionally 'True' and these terms need not be rechecked. Otherwise, it is flagged as 'False' and the update is either aborted or further processed to remove the logical inconsistency. In a further enhancement, multi-variable terms are checked as soon as modifications to the 'after image' of the relation have been completed (both Deleted and Inserted applied) for the particular modification request, but subsequent changes to the relation will require that they be rechecked and so these they can at best be flagged as conditionally 'True'. In a further enhancement, or alternative embodiment, multi-relation constraints are checked as soon as all modifications in the modification request to relations referenced by that constraint have been completed; if any of the relations is subsequently and further modified, the multi-relation constraint must be rechecked. In another further enhancement providing optimized performance and physical resource usage, each predicate term and constraint is checked as early as possible and then only rechecked at commit time if any further modifications might affect the validity of the check. An example of this latter enhancement maintains a list of predicate terms and constraints in computer storage, with each being flagged if they have been already checked and further flagged if and when any subsequent modification invalidates that check. Then, at transaction commit, each predicate term or constraint that has not previously been checked or has been flagged as invalidated is checked or re-checked as necessary.

In a further enhancement, the method is applied to tables containing any of duplicate rows, nulls, default values, rows with dissimilar semantics, or any combination of these. While the specific results of the method depends on the particular mechanisms used by the particular RDBMS for modifying rows (such as the order in which operations are applied), the results are nonetheless determined and predictable. With respect to the methods of the present invention, duplicate rows may then be treated as though they were unique, nulls as though they were real values, default values as though they were supplied explicitly as constant values in the update request, and rows with dissimilar semantics as though the table were a relational union of multiple relations or that the relation predicate is defined by those properties and constraints that the set of rows have in common.

In a further embodiment, the relation predicate and all constraints are stored and manipulated as relational expressions, as logical expressions, or an arbitrary combination of these. When one or more expressions need to be combined or evaluated jointly, those expressions are first translated into a common symbolic form.

The scope of this invention includes any combination of the elements from the different embodiments disclosed in this specification, and is not limited to the specifics of the preferred embodiment or any of the alternative embodiments mentioned above. Individual user configurations and embodiments of this invention may contain all, or less than all, of the elements disclosed in the specification according to the needs and desires of that user. The claims stated herein should be read as including those elements which are not necessary to the invention yet are in the prior art and are necessary to the overall function of that particular claim, and should be read as including, to the maximum extent permissible by law, known functional equivalents to the elements disclosed in the specification, even though those functional equivalents are not exhaustively detailed herein.

I claim:

1. A method for merging, distributing, and versioning databases comprising:
    selecting a set of source datastores and a set of target datastores;
    identifying a first source datastore belong to the set of source datastores;
    reading and acquiring a first source logical representation of the first source datastore;
    formulating the first source logical representation as a collection of tables and constraints;
    developing a first symbolic abstraction of the first source logical representation functionally equivalent to a first set of membership abstractions and constraints among them expressed as predicates;

identifying a first target datastore belonging to the first set of target datastores;

acquiring a first target logical representation of the first target datastore;

formulating the first target logical representation as a collection of tables and constraints;

developing a second symbolic abstraction of the first target logical representation functionally equivalent to a second set of membership abstraction and constraints among them expressed as predicates;

deriving from the second target symbolic abstraction a first set of derived membership abstractions and constraints among them which are equivalent to the first source symbolic abstraction;

deriving a first derived target logical representation consistent with the second target symbolic abstraction;

providing a set of access methods for reading and writing data having a logical representation as tables, to physical storage of the source and target datastores;

reading, using the set of access methods, a first set of data from the first source datastore using the first source logical representation to read, using the access methods, a first set of data from the first source datastore the first source logical representation;

deriving a set of write instructions for writing data to tables in the first target logical representation from the set of derived write instructions for writing data to tables in the first derived target logical representation; and, writing the first set of data to the first target datastore via tables in the first derived logical representation using the second set of write instructions.

2. A method as in claim 1 wherein the set of source datastores further comprises at least a second source datastore, and the first set of data is read from both the first source datastore and the second source datastore.

3. A method as in claim 1 wherein the set of target datastores further comprises at least a second target datastore and a first portion of the first set of data is written to the first target datastore and a second portion of the first set of data is written to the second target datastore.

4. A method as in claim 1 wherein the first source datastore's physical location and the first target datastore's physical location are one and the same.

5. A method as in claim 3 wherein the second target datastore is a new version of the source datastore.

6. A method as in claim 1 wherein at least one of the first source datastore and the first target datastore is managed by a non-relational DBMS.

7. A method as in claim 1 wherein at let one of the first source datastore and the first target datastore is managed by a commercial variant of a relational DBMS.

8. A method as in claim 1 wherein at least one of the first source datastore and the first target datastore is managed by a file management system.

9. A method as in claim 1 wherein the source datastore differs from the target datastore by at least one of physical representation, logical representation, physical location, file management system, and data management system.

10. A method as in claim 1 wherein the first set of data is destructively removed from source datastore, effectively transferring the first set of data to the first target datastore.

11. A method as in claim 1 wherein the source datastore and the target datastore have in common at least one of physical representation, logical representation, file management system, data management system, and physical location, the latter including being any combination of physically intermingled and physically co-located.

12. A method as in claim 1 wherein at least one source datastore data element is used to perform a modification operation on the target datastore, the modification operation being at least one of a set of actions comprising updating, deleting, and replacing and applied to at least one target datastore data element.

13. A method as in claim 1 wherein at least one source datastore data element is used to augment the target datastore.

14. A method as in claim 1 wherein at least one of the source datastore and the target datastore constitute a first distributed database, further comprising:

creating a common logical representation for both the source datastore and the target datastore; and, using the common logical representation to perform an operation on data in at least one of the source datastore and the target datastore, said operations including at least one operation of accessing and manipulating data.

15. A method as in claim 1 further comprising:

performing an operation on data in at least one of the source datastore and the target datastore, said operation including accessing and manipulating data in at least a first table; and, distinguishing the first table from at least a second table by differences in their respective membership abstractions. and affecting said operation according to said differences.

* * * * *